June 27, 1961 W. G. ROMAN 2,990,349
REACTOR
Filed Sept. 12, 1955 8 Sheets-Sheet 1

Fig. I.

INVENTOR
Walter G. Roman.
BY Arthur T. Stratton
ATTORNEY

June 27, 1961 W. G. ROMAN 2,990,349
REACTOR
Filed Sept. 12, 1955 8 Sheets-Sheet 3

W. G. ROMAN 2,990,349

REACTOR

Filed Sept. 12, 1955

June 27, 1961  W. G. ROMAN  2,990,349
REACTOR

Filed Sept. 12, 1955  8 Sheets-Sheet 5

United States Patent Office 2,990,349
Patented June 27, 1961

2,990,349
REACTOR
Walter G. Roman, Whitehall, Pa., assignor, by mesne assignments, to the United States of America as represented by the United States Atomic Energy Commission
Filed Sept. 12, 1955, Ser. No. 533,560
1 Claim. (Cl. 204—154.2)

The principal object of this invention is to provide a means for controlling a nuclear reactor and, more particularly, to provide a means for controlling the power level at which a reactor using a liquid moderator will operate.

In any reactor which is operating at a constant power level, the fission rate must remain constant. This means that for every fission in the fuel of the reactor, one of the fast neutrons resulting from the fission must be made available for absorption in the fissionable fuel, such as U-235 or Pu-239, to produce another fission, thus sustaining the chain reaction. The neutrons produced in each fission over and above the one required for sustaining the chain reaction may be permitted to leak out of the reactor in slowing down to thermal energies, leak out after being thermalized, be absorbed in the moderator or structural material or fertile material in the reactor, or be absorbed in poison material added to the reactor for control purposes. In order to change the power level at which the reactor is operating or to compensate for the buildup of neutron absorbing poisons in the reactor due to the fission fragments or the burnup of fissionable material in the reactor, it is necessary that the ratio of neutrons generated to neutrons absorbed in the fissionable material be controlled. In present reactors, this control is obtained by varying the quantities of neutron absorbing material or poisons in the reactor. This can be done in two ways. The first and more common method is to introduce neutron absorbing material into the reactor in the form of rods whose position in the reactor can be adjusted mechanically to control the neutron absorbing rate. A second method is to introduce a neutron absorbing material in the form of a dissolved salt in the coolant used for cooling the reactor. The neutron absorption rate in the case of a dissolved salt may be adjusted by varying the concentration of the salt in the reactor coolant.

While both of the above-described methods of controlling a reactor are workable and have been successfully used, they are expensive and difficult to manufacture and operate. The first scheme requires mechanical motion of the control rods and results in complex machinery which must be operated in the presence of high temperature reactor coolants. In the case of a reactor using pressurized water as the coolant and also as the moderator, this means that the machinery cannot be lubricated and, in addition, renders the machinery difficult to service and maintain. The second method requires the addition of complex systems to the reactor coolant system in order that the soluble salt may be added or removed from the coolant system as required to control the reactor.

This invention solves the above problems by providing a method by which the leakage of neutrons from the reactor and their absorption in fertile materials is controlled by varying the average density of the moderator. More specifically, the invention provides a method for varying the average density of a liquid cooled and moderated reactor so that the reactor itself automatically supplies the power demanded of it. The result is a reactor which automatically controls itself to supply the power demanded of it without the necessity of additional control means. In addition to controlling the reactor, the varying of the moderator density increases the absorption of neutrons in fertile materials and flattens the neutron flux in the reactor core. The neutron flux in the reactor core will be flattened since the control means is sensitive to the temperatures existing in various portions of the reactor to equalize the temperatures over the reactor. When the temperatures are equalized the power level will also be equalized and thus the neutron flux will be equalized or flattened.

Accordingly, the principal object of this invention is to provide a novel automatic control system for a nuclear reactor so that the reactor automatically supplies the power demanded of it.

Another object of this invention is to provide a unique method for automatically controlling the loss of neutrons from a reactor to control the power level at which the reactor operates.

Another object of this invention is to provide a unique method for controlling the loss of neutrons from a reactor by providing automatic means for varying the average density of the moderator to control the power level at which the reactor operates.

Another object of this invention is to provide an automatic control for a reactor which increases the absorption of fast neutrons in fertile material in a reactor core by allowing a greater leakage of fast neutrons into the fertile material.

Another object of this invention is to provide control means which improves the performance of seed type reactors by increasing the leakage of neutrons from the seed core to the blanket of fertile material surrounding the core.

Another object of this invention is to provide a novel control means which requires no neutron absorbing control rods and mechanisms for moving the rods.

Another object of this invention is to provide a novel design of a reactor using a pressurized liquid as the coolant and moderator in which the reactor pressure vessel and pressurizer for the coolant system are included in one vessel.

Another object of this invention is to provide a novel design for a pellet reactor having two separate zones, one of said zones being designed so that the pellet bed will be non-critical when contained therein, the other zone being designed so that the pellet bed will be critical when contained therein.

Another object of this invention is to provide a unique design of a pellet reactor having two separate zones for the pellets with means for transporting the pellets from one zone to the other when it is desired to start up or shut down the reactor.

Another object of this invention is to provide a unique design of a pellet reactor having an automatic control system so that the reactor automatically supplies the power required of it.

Another object of this invention is to provide a design of heterogeneous reactor which uses a liquid as both the coolant and moderator with novel means for starting and stopping a chain reaction.

Numerous other objects and advantages will be apparent to those skilled in this art from the following detailed description of three specific embodiments, when taken in connection with the attached drawings, in which.

The reactor shown in FIGS. 1 through 9 is of the highly enriched type which may be made small enough to be suitable for the propulsion of various types of conveyances such as trains or ships. This type of reactor uses fuel which is essentially pure U-235 and a liquid coolant which may also act as a moderator to slow fission neutrons to neutrons of thermal velocity. Water is a highly successful coolant and moderator for such a reactor if it is maintained under sufficient pressure to prevent its boiling in the reactor core. A pressure on the order of 2,000 pounds per square inch is satisfactory for a reactor designed to produce steam in a separate heat exchanger having a pressure in the range of 400 to 450 pounds per square inch.

The nuclear characteristic of such a reactor will depend upon the multiplication or ratio of neutrons available for fission in any generation or the neutrons released in any one fission to those available in the previous generation which may be expressed by the formula $$k_{eff} = \frac{\eta \epsilon p f p_t}{p_t} \quad (1)$$

When $k_{eff}$, or the multiplication factor, expressed by the above formula is equal to 1, the reactor will operate at a constant power level. Likewise, if the $k_{eff}$ is greater than 1, the power level will increase, and if it is less than 1, the power level will decrease. In the above formula, the factor $\eta$ is the number of fission neutrons produced by each thermal neutron absorbed in the U-235 and is approximately equal to 2.09. The fast fission effect $\epsilon$ in U-235 is negligible and therefore may be considered equal to 1 in the case of a highly enriched reactor. Since the resonance capture expressed by $p$ in the above formula in U-235 is also negligible, it may also be considered equal to 1. Therefore, for the first three terms of the above formula, we have $$\eta \epsilon p = 2.09 \quad (2)$$

The probability that a thermal neutron will be captured in the U-235 fuel rather than the other material in the reactor is the thermal utilization $f$. It is equal to $$f = \frac{\Sigma_a^{235}}{\Sigma_a^{235} + \Sigma_a} \quad (3)$$

Where $$\Sigma_a^{235}$$

is the macroscopic absorption cross section of U-235 and $\Sigma_a$ is the macroscopic absorption cross section for all other material in the reactor core. The probability that a fission neutron will be slowed down to thermal energy without leaking from the reactor is $P_f$ and equal to $$P_f = e^{-\tau B^2} \quad (4)$$

where $e$ is the base of natural logarithms. In this equationtion $\tau$ is the age and is proportional to the mean square crow flight distance a neutron will travel while being thermalized. Since neutrons are slowed down by collisions with other atoms in the reactor, it is obvious that $\tau$ will be a function of the moderator density as well as the density of other materials in the reactor. Thus $\tau$ will be a function such as $$\tau = c + \frac{d}{(P_{H_2O})^2} \quad (5)$$

In this expression, the constant $c$ will be determined by the materials in the reactor other than the moderator. The second term of the above equation expresses the effect of the density of the moderator on $\tau$ and the constant $d$ will be determined by the reactor structure and operating temperature. The term $P_{H_2O}$ is the density of the moderator. The probability that a thermal neutron will be absorbed in either the fuel, moderator or structural material of the reactor before it leaks out of the reactor $P_t$ and is expressed by $$P_t = \frac{1}{1 + L^2 B^2} \quad (6)$$

In this expression L is the diffusion distance for thermal neutrons and $$L = \frac{1}{3\Sigma_s \Sigma_a} \quad (7)$$

The macroscopic absorption cross section $\Sigma_a$ is defined above. $\Sigma_s$ is the macroscopic scattering cross section of all materials in the reactor. The $B^2$ term is called the geometric buckling and is a measure of the reactor physical size. For a cylindrical reactor, $$B^2 = \left(\frac{\pi}{H}\right)^2 + \left(\frac{2.405}{R}\right)^2 \quad (8)$$

where H is the height of the reactor in cm. including the extrapolated boundaries and R is the radius in cm. including extrapolated boundaries.

Thus it can be seen that a change in the moderator density will have a direct effect on the reactivity of the reactor as presented by Equation 1. This is so since the probability that a neutron will be slowed down before leaking out of the reactor as expressed in Equation 4 will change as will the distance required to thermalize a neutron as expressed in Equation 5. In order to determine the exact effect on reactivity, it may be assumed that the moderator density is reduced. The number of neutrons released per fission will not be affected by changes in the moderator density, and since $\epsilon$ and $p$ are equal to 1 in highly enriched reactors, the term expressed by Equation 2 will remain constant and will have no effect on the reactivity. Reducing the moderator density will reduce the macroscopic absorption cross section $\Sigma_a$ and therefore the thermal utilization $f$ as expressed in Equation 3 will increase. This will tend to make the reactor more reactive. The age $\tau$ of the thermal neutrons will increase with decreased moderation density as shown by Equation 5. Since $\tau$ is part of a negative exponential term in the expression for the probability that a fission neutron will be thermalized P$f$ in Equation 4 this term will decrease for a decrease in moderator density and will cause a decrease in reactivity. The thermal diffusion distance L will be increased by a decrease in the moderator density as shown in Equation 7. This will decrease the possibility that a thermal neutron will be absorbed in fuel or moderated P$_t$ as expressed in Equation 6 and therefore will cause a decrease in the reactivity. It is therefore apparent that a decrease of the moderator density has a dual effect. It tends to increase the thermal utilization $f$ and therefore the reactivity. It also tends to increase the fast leakage P$f$ and thermal leakage P$_t$ of neutrons from the reactor and therefore decrease the reactivity. In a small reactor the buckling B$^2$ will be large and therefore the leakage effects will be large.

However, by proper choice of the ratio of fuel and structural material to moderator in the reactor core, the thermal utilization $f$ can be minimized. The following detailed description will set forth the design of one reactor for accomplishing this result. In such a reactor a decrease in the moderator density will reduce the reactivity level of the reactor. Thus if the moderator density is varied inversely with the temperature of the reactor, the reactor will be self-controlling and supply the power demanded of it.

Figure 1:
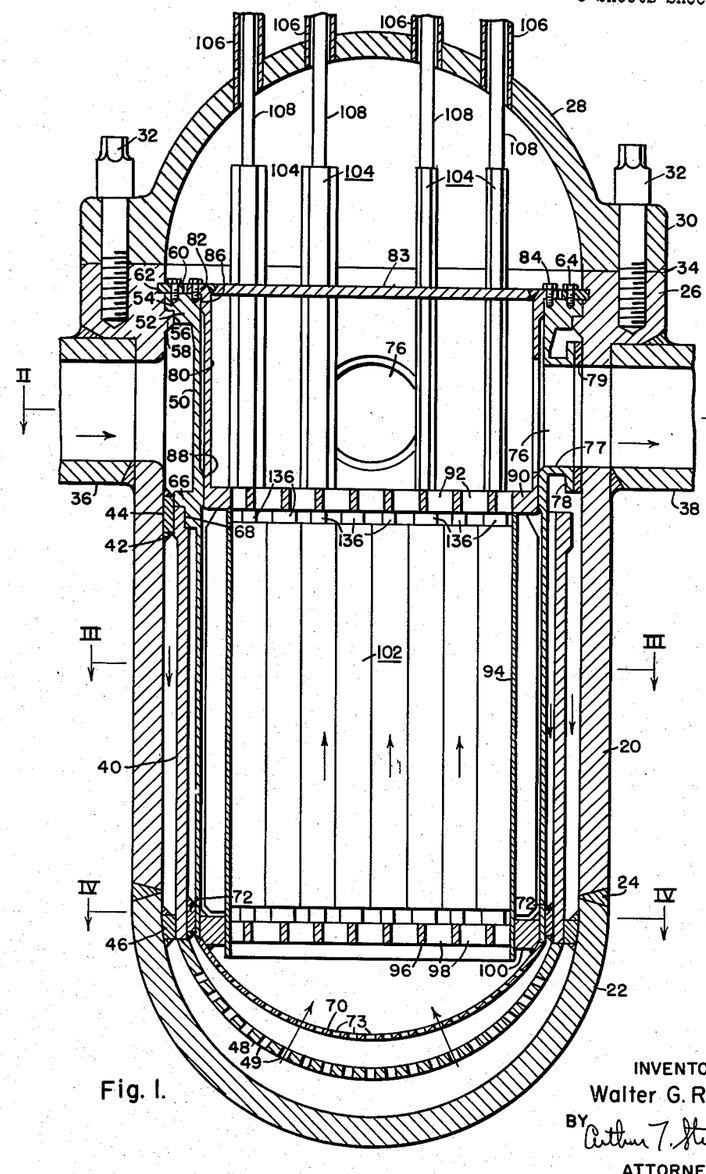
FIGURE 1 is a longitudinal section showing one embodiment of this invention in which the fuel is in the form of individual plates.
Figure 2:
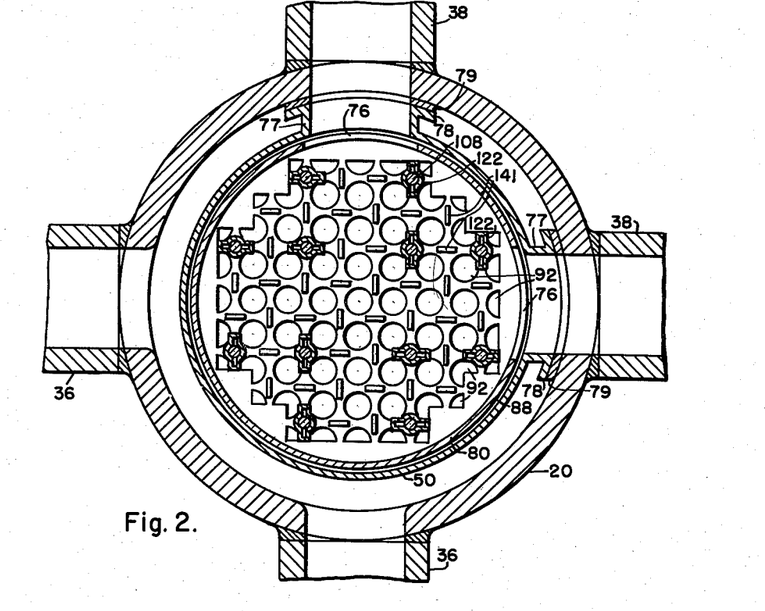
FIG. 2 is a horizontal section taken along line II—II of FIG. 1 showing the coolant inlet and outlet openings in the pressure vessel.

Referring now particularly to FIG. 1, there is shown a small highly enriched reactor capable of supplying 35,000 kilowatts of power at a heat rate of $1.195 \times 10^8$ B.t.u.'s per hour with a useful core life of 2500 hours. If water under high pressure is used as the coolant moderator, a flow of $2.891 \times 10^6$ pounds per hour will be required to transfer this amount of heat when a 35 degree Fahrenheit temperature rise in the coolant is used for transferring heat from the reactor to the heat exchanger. This reactor has a closed pressure vessel in which the fuel elements are mounted and means for directing a flow of liquid coolant over the fuel elements and out of the reactor. As the coolant flows over the fuel elements it will be heated and the heated coolant can then be used to convert water into steam in well known types of heat exchangers. The reactor pressure vessel has a cylindrical shaped center section 20 which is joined to a hemispherical bottom section 22 by means of an annular weld 24. The reactor vessel may be constructed of any desired material having sufficient strength to withstand the pressure of the coolant used such as ordinary carbon steel. If ordinary carbon steel is used for fabricating the reactor pressure vessel, it is preferable to clad the inner surface of the pressure vessel with a corrosion resistant material, such as stainless steel, in order to resist the corrosive effects of the coolant. The top opening of the cylindrical center section 20 is closed by means of a hemispherical shaped cap 28, formed of the same material as center section 20. The cap 28 has an outwardly projecting radial flange 30 formed at its open end which fits on a flange 26 at the top of the center section 20. A plurality of bolts 32 which pass through suitable holes in the radial flange 30 and thread into a radial flange 26 formed on the top of the center section 20 are used for securing the top cover 28 to the center section 20. It may be desirable in some applications to seal the joint between flanges 26 and 30 by a small weld at 34 in order to prevent leakage. Suitable coolant inlet pipes 36 and outlet pipes 38 are attached to the pressure vessel by welding or the like. The coolant inlet and outlet pipes communicate with openings in the pressure vessel as shown in FIG. 1.

Mounted in the pressure vessel is an outer cylindrical thermal shield 40 radially spaced from the pressure vessel formed of a corrosion resistant material, such as stainless steel, which provides some protection for the pressure vessel from neutron, gamma and beta radiations of the reactor core. The thermal shield may be attached to the pressure vessels by any desired means, such as a series of cap screws (not shown) which pass through the thermal shield 40 and thread into a plurality of circumferentially spaced pads 44 at the upper end of the thermal shield 40. The pads 44 may be attached to the inner wall of the pressure vessel by means of welds 42 and should be circumferentially spaced so that coolant may flow downward in the annular space between the thermal shield 40 and the pressure vessel. The lower end of the thermal shield may be attached to similar circumferentially spaced pads 46 by any desired means, such as cap screws or the like. Attached to the lower end of the thermal shield 40 is a hemispherical shaped diffusion plate 48 also formed of a corrosion resistant material, such as stainless steel. The diffusion plate 48 may be attached to the thermal shield by any desired means, such as welding, and it is provided with a plurality of openings 49 so that coolant which passes downward through the annular area between the pressure vessel and the thermal shield 40 may flow upward through the reactor core. A second cylindrical thermal shield 50 which is radially spaced inwardly from the thermal shield 40 is also mounted in the pressure vessel and formed of a corrosion resistant material, such as stainless steel. The thermal shield 50 has an outwardly projecting circumferential flange 54 formed on an enlarged portion 52 at its upper end. The circumferential flange 54 rests on an inwardly projecting shoulder 58 formed in the upper end of the pressure vessel and is locked in position by means of the ring 60. The ring 60 which fits on a groove 62 formed in the top portion of the center section 20 may be formed in a plurality of sections, each one of which is retained in place by cap screws 64 which pass through the ring and thread into the flange 54. The upper portion of the thermal shield 50 is radially spaced inwardly from the inner surface of the thermal shield 40 by means of a plurality of circumferentially spaced projections 68 formed on its outer surface. The projections 68 have an outwardly projecting surface 66 formed on their outer edge which rests on the top and adjacent inner surface of the thermal shield 40. The lower end of the thermal shield 50 is radially spaced inwardly from the inner surface of the thermal shield 40 by means of a series of circumferentially spaced pads 72 which may be attached to the inner surface of the thermal shield 40 by any desired means, such as welding. Attached to the lower end of the thermal shield 50 is a second diffusing plate 70, also formed of stainless steel or similar corrosion resistant material. The diffusing plate 70 is provided with a plurality of openings 73 which allow the coolant to flow upward through the reactor core. Provided in the upper portion of the thermal sleeve 50 are two circular openings 76 which connect with the coolant outlets 38, by means of an outwardly projecting tubular portion 77 and a spacer 79. The tubular portion 77 is formed integral with the thermal shield 50 and may be attached to the inner surface of the pressure vessel by any suitable means such as a series of cap screws (not shown) which may pass through the outwardly projecting flange 78 and spacer 79 and thread into the pressure vessel.

There is thus provided a closed pressure vessel fabricated of suitable material to withstand the pressure of the coolant used for cooling the reactor and having a suitable corrosion resistant lining. Mounted in the interior of the pressure vessel are two cylindrical thermal sleeves which are radially spaced from the pressure vessel and from each other which form a thermal barrier between the reactor core and the pressure vessel. There is also provided suitable coolant inlets and outlets so that the coolant may flow into the pressure vessel and then downward between the annular areas surrounding the thermal sleeves and then upward through the reactor core and out the coolant outlets. Of course, as the coolant passes through the reactor core it is heated and after passing out the coolant outlets it may pass through suitable heat exchangers and convert water into steam.

Figure 3:
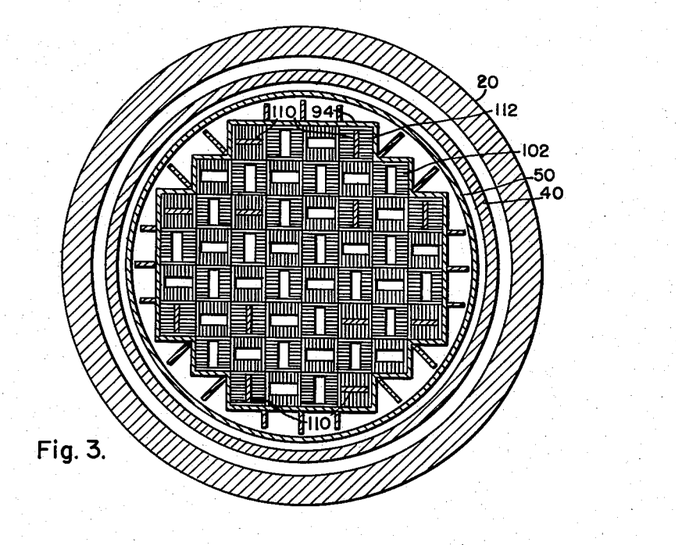
FIG. 3 is a horizontal section taken along line III—III of FIG. 1 showing the arrangement of the individual fuel element subassemblies and control rods.

Mounted on the inner surface of the thermal shield 50 is an upper core support member 80 having a cylindrical shape with its top and bottom closed. The support member 80 is formed of a corrosion resistant material such as stainless steel and has an outwardly projecting flange 82 at its upper end which rests on the top of the enlarged portion 52 of the thermal shield 50. A plurality of cap screws 84 which pass through the flange 82 and thread into the enlarged upper portion 52 of thermal shield 50 are used for securing the support member 80 in position. The top opening of the support member 80 is closed by means of a flat circular plate 83 which may be secured to the support member 80 by any desired means such as welding. The support member 80 is positioned radially inwardly in relation to the inner surface of thermal sleeve 50 by means of an outwardly projecting cylindrical surface 86 at its upper end which closely engages the inner surface of the thermal shield 50, and an inwardly projecting surface 88 formed on the inner surface of the thermal sleeve 50 which rests against the outer surface of the lower end of support member 80. The bottom wall 90 of the support member 80 is relatively thick, and supports the upper end of the individual fuel element subassemblies 102. The bottom wall 90 is provided with a plurality of openings 92 (FIG. 2) which allow the coolant to pass out of the reactor core and flow out the coolant outlets 38. Attached to the bottom surface of the bottom wall 90 by any desired means, such as welding, is a tubular member 94 having a generally square cross section with the corners cut off so that it approximates a circular cross section also formed of stainless steel or similar corrosion resistant material. The tubular member 94 surrounds the individual fuel element subassemblies 102 as shown in FIG. 3. The lower end of the tubular member 94 is attached to a lower support plate 96 by any desired means, such as welding or the like, and it supports the lower end of the individual fuel element subassemblies 102. The lower support member 96 is provided with a plurality of openings 98 (FIG. 4) which allow the coolant to flow into the reactor core. The lower end of the tubular member 94 is radially spaced from the inner surface of the thermal shield 50 by means of an annular member 100. The annular member 100 may be attached to the thermal shield 50 by any desired means, such as welding, and in addition to radially spacing the tubular member 94, also closes the annular area between the tubular member 94 and the thermal shield 50 so all of the coolant will flow upward through the reactor core instead of being bypassed around the reactor core. Mounted on the top of the upper supporting plate 90 are a plurality of control rod drive assemblies 104. Each of the individual control rods 110 are driven in a linear direction by means of a shaft 108 which is attached at its upper end to any suitable linear motion device. An example of such a linear motion device is disclosed and claimed in a copending application entitled "Linear Motion Device" by Roman and Robinson, Serial No. 496,-688, filed on March 25, 1955, now Patent No. 2,780,740 and assigned to the same assignee as this invention. Each of the individual drive shafts 108 passes through a thimble 106 which is secured in an opening in the head 28 of the pressure vessel. In this manner, the reactor coolant can completely fill the pressure vessel and flow up into the linear motion device used for driving the shafts 108, thus eliminating the need for any mechanical seals between the drive mechanisms and the reactor pressure vessels.

Figure 4:
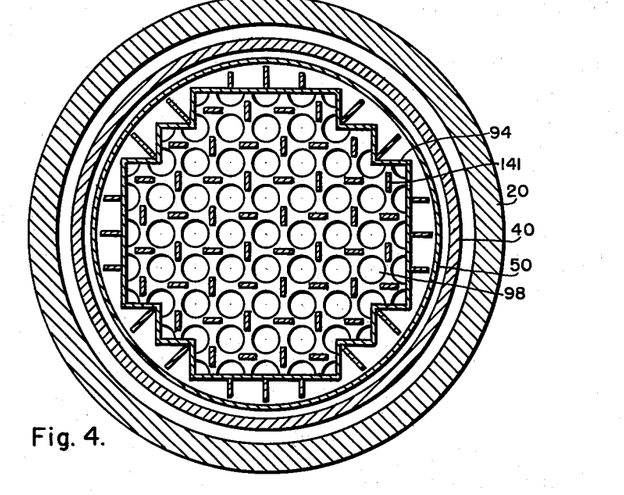
FIG. 4 is a horizontal section taken along line IV—IV of FIG. 1 showing the mounting holes for the lower ends of the individual fuel element subassemblies.
Figures 7, 9:
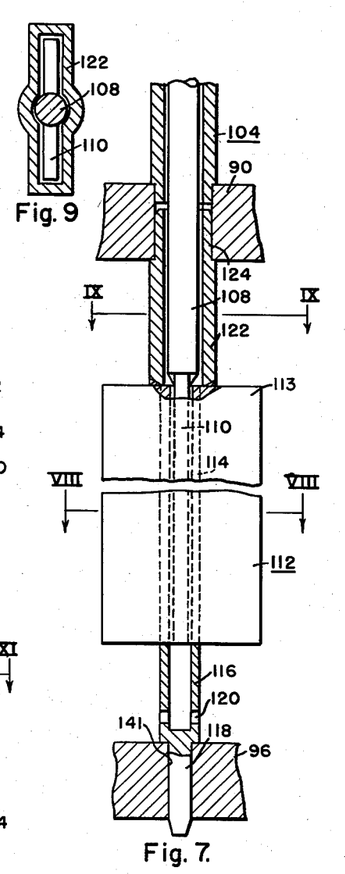
FIG. 7 is an elevation view shown partly in section of a modified fuel element subassembly to allow for the insertion of control rods into the subassembly.
FIG. 9 is a horizontal section taken along line IX—IX of FIG. 7 showing the cross section of the control rods and mechanism drive shaft.
Figure 8:
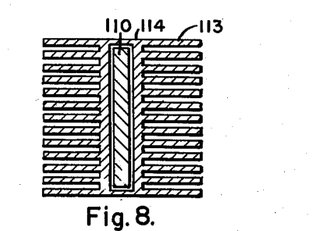
FIG. 8 is a horizontal section taken along line VIII—VIII of FIG. 7 showing the mounting of the individual fuel element plates of the modified subassembly.

The arrangement of one individual control rod in its fuel element subassembly 112 is shown in FIGS. 7, 8 and 9. As shown in FIG. 9 the individual control rods 110 have a general rectangular shaped cross section and may be fabricated from any suitable neutron absorbing material, such as hafnium, boron or cadmium. For the reactor shown in FIG. 1, the individual control rods should have an approximate cross section of ⅜ inch by 2½ inches. Each control rod 110 moves linearly in a tubular member 114 of rectangular section, to which the inner individual fuel plates 113 of its subassembly are secured. The individual fuel plates 113 will be described in detail below. Attached to the lower end of each tubular member 114 by any desired means such as by welding, is a hollow end cap 116 which terminates in a solid downwardly extending tongue 118. Each tongue 118 and end cap 116 may have a rectangular cross section and the tongue may fit in a suitably shaped opening 141 in the bottom support plate 96 as shown in FIG. 4. Side openings 120 are provided in each end cap 116 so that some of the coolant will flow upward through the center of the end cap 116 and the tubular member 114 thus cooling the control rod 110. Attached to the upper end of each tubular member 114, by any desired means such as welding, is a hollow sleeve 122 which is also rectangular in section and has a reduced extension 124 formed on its upper end. Each extension 124 may also be rectangular in section and is positioned in a similar shaped opening in the upper support plate 90. Secured to the top of the support plate 90 in line with each opening in the support plate 90 for each extension 124 is a tubular shroud 104 which surrounds the drive shaft 108.

There is thus provided a means whereby the individual fuel element subassemblies containing the control rods may be mounted between the two support plates 90 and 96. All of the fuel element subassemblies 112 containing control rods 110 as well as all of the regular fuel element subassemblies 102 are mounted between the support plates 90 and 96 and then the two support plates are secured to the ends of the tubular member 94 thus forming a complete reactor core. While control rods are shown installed in the reactor of FIG. 1, they are not used during the operation of the reactor but are only used for starting and stopping the reactor, or as safety rods in case it is necessary to scram the reactor. In building a reactor core, it is, of course, necessary to provide sufficient excess fuel so that as fuel is consumed during the life of the reactor core, the reactor will still be capable of operating at its rated power level. This excess fuel provides an excess of reactivity and some means must be provided for eliminating this excess reactivity so that the reactor may be shut down when desired. The control method disclosed herein will control this excess reactivity when the reactor is operating, but will not control the excess reactivity when the reactor is shut down. This means is provided by the control rods 110 but could also be provided by injecting suitable poisons into the reactor coolant which, in turn, would shut down the reactor. It is not desirable to inject poisons into the reactor coolant since they must be removed in order to start the reactor again. The drive means for the individual control rods 110 may be made relatively simple and need not be as complicated as that disclosed in the above copending application, since it will be only necessary to move the rods to and from extreme inner and outer positions relative to the reactor core, and it will not be necessary, as in previous reactors, to accurately position the rods within the core at intermediate positions. Thus a simple in and out hydraulic rod mechanism utilizing the reactor coolant as the hydraulic fluid may be used.

Figure 5:
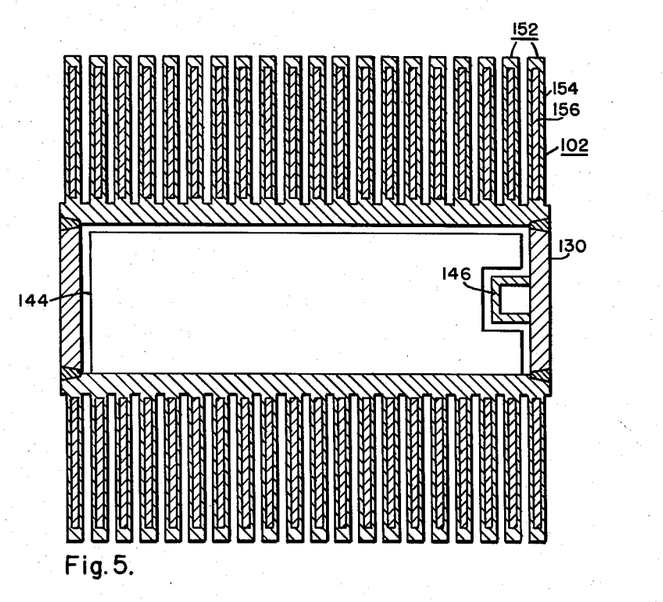
FIG. 5 is an enlarged horizontal section taken along line V—V of FIG. 6 showing the attachment of the individual fuel element plates to the supporting member of each individual fuel element subassembly.
Figure 6:
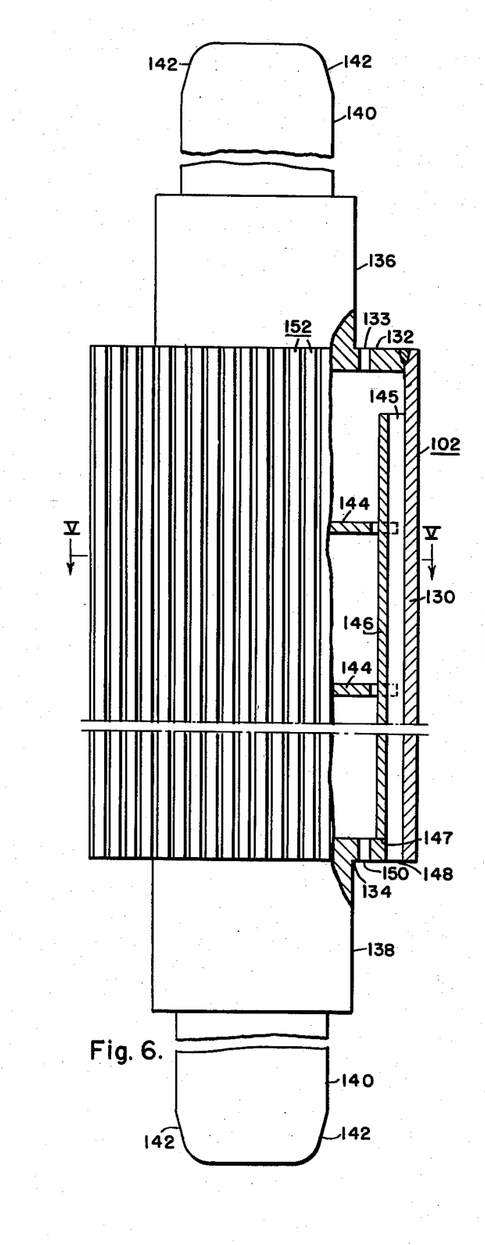
FIG. 6 is an enlarged elevation view of one fuel element subassembly shown in FIG. 1 shown partly in section.

One of the regular individual fuel element subassemblies 102 is shown in FIGS. 5 and 6 and it comprises a tubular center support 130. The fuel plates 113 of the subassemblies 112 containing the control rods will be similar to the fuel plates 152 described below for the regular subassemblies 102. The tubular center support 130 may be fabricated from four flat plate members which are welded together to form a tubular member having a rectangular cross section as shown in FIG. 5. The material used in fabricating the tubular member 130 should have a low cross section for the absorption of thermal neutrons as well as high corrosion resistance and is preferably fabricated from zirconium or an alloy of zirconium. The open ends of the tubular member 130 are closed by means of suitable end caps 132 and 134 which are attached to the tubular member 130 by welding or the like. Each end cap has a suitable spacer 136 or 138 formed integral with it so that the upper and lower ends of the fuel element subassemblies 102 are spaced from the upper support plate 90 and the lower support plate 96. In addition, end cap 132 is provided with a small vent opening 133 which allows gas to escape from the tubular member 130 when the reactor is filled with coolant. The vent 133 also allows the escape of gases dissolved in the coolant during operation of the reactor. However, the vent opening 133 should be sufficiently small in size that the member 130 is not freely vented but will restrict the escape of gas or vapor so that it will take a predetermined time for the escape of a given volume of gas or vapor. Each of the spacers 136 and 138 terminates in a tongue 140 which has a rectangular cross section similar to the tongue 118 on the modified subassembly 112 shown in FIG. 7. Each tongue 140 has converging outer sides 142 which facilitate the guiding of the tongue into the openings 141 in the lower support plate 96 as shown in FIG. 4. Similar openings are provided in the upper support plate 90. The interior of each tubular member 130 is provided with a series of horizontal baffles 144, also formed of zirconium or an alloy of zirconium, which are spaced from the two end surfaces and one side surface of the tubular member 130 as shown in FIG. 5 and attached to the other side surface by any suitable means such as welding. Also mounted in the interior of the tubular member 130 is a channel shaped steam vent 146 having a square cross section which terminates in an open end 145 at its upper end which is spaced from the top end cap 132 and has its lower end 147 secured to the bottom end cap 134. Two small openings 148 and 150 are provided in the bottom end cap 138 so that the coolant may flow into the tubular member 130 by means of opening 150 and any vapor of the coolant may pass out of the tubular member 130 by means of the steam vent 146 and the opening 148, respectively. The individual fuel plates 152 are attached to the outer surface of the tubular member 130 on two sides by any desired means, such as welding. Each of the fuel plates 152 comprises an inner core 156 which contains the fuel and an outer cladding 154. As described previously, the reactor shown in FIG. 1 is designed to use highly enriched fuel. Such a fuel would contain 90% or more of the uranium isotope 235 and the remainder of the isotope 238, and other impurities. In order that this fuel may be efficiently used in a reactor, it must be alloyed with another metal, such as zirconium, so that the complete fuel alloy will have a greater volume and thus present sufficient surface so that the heat can be efficiently transferred from the fuel to the coolant when the fuel fissions. For the reactor shown in FIG. 1, 17.08 kilograms of U-235 would be required and this amount of fuel should be uniformly distributed through the individual fuel plates 152 of the 52 fuel element subassemblies of the reactor of FIG. 1. The individual fuel element subassemblies 102 should have a cross section as shown in FIG. 5 of 3.2 inches per side and each individual fuel plate 152 will be 1.00 inch wide, .09 inch thick and 36 inches long. The fuel plates 152 would preferably have a cladding 154 .025 inch thick and an inner fuel core 156 .040 inch thick thus giving a total thickness for the fuel plate 152 of .09 inch. When the individual fuel element subassemblies are assembled between the upper support plate 90 and the lower support plate 96, they will have a dimension of 26 inches across the flats of the tubular member 94 as shown in FIG. 4. The 52 individual fuel element subassemblies 102, the upper and lower support plates, the control rod drive mechanisms, tubular member 94 and the reactor top 28 are assembled as one complete unit outside of the reactor and comprise the reactor core. As can be seen in FIG. 1, this core can be assembled completely outside the reactor and then installed in the reactor, and in this manner the reactor can be refueled as the fuel in this individual fuel plates 152 is consumed.

In order to operate the reactor shown in FIG. 1, it is first necessary to establish a flow of coolant through the reactor core. This flow of coolant will fill the tubular members 130 of the individual subassemblies 102 by flowing in opening 150 and any air trapped in the tubular member 130 will be vented through opening 133. Then the reactor control rods 110 may be withdrawn and the fissioning of the fuel contained in the individual plates 152 will commence. As the chain reaction multiplies, the temperature of the individual plates will increase. As the temperature increases, part of the coolant which fills the tubular member 130 of the individual fuel element subassemblies will be converted to a vapor since it is a stagnant volume and will retain most of the heat transferred to it from the fuel plates, thus decreasing the average density of the coolant surrounding the reactor core. Of course, a small amount of vapor will escape through vent opening 133, but this will be a small amount because of the small size of opening 133 relative to the rate at which vapor is formed. As the coolant temperature continues to increase, more of the coolant will be converted to a vapor and the average density of the coolant will decrease further. A point of equilibrium between the conversion of coolant to a vapor and the escape of vapor through opening 133 will be reached at a certain temperature and the reactor will operate at this temperature. This point of equilibrium will depend upon the power demanded of the reactor and at this point a portion of the volume of the tubular member 130 will be filled with a vapor of the coolant and a portion will be filled with liquid coolant. For example, as the power demand increases, the average inlet temperature of the coolant to the reactor will decrease which, in turn, will decrease the temperature of the coolant surrounding the fuel element subassemblies. As the temperature of the coolant decreases, part of the vapor of the coolant contained in the tubular member 130 will be transformed into liquid coolant thus increasing the average density of the coolant surrounding the fuel element subassemblies. As the average density of the coolant increases, more fission neutrons will be slowed down to thermal neutrons thus increasing the reactivity of the reactor which, in turn, will raise the tempearture of the individual fuel elements 152. As the temperature of the fuel elements 152 rises, the temperature of the coolant leaving the reactor will likewise rise, thus supplying the increased power demand required of the reactor. A point of equilibrium between the rise in the temperature of the fuel elements and the average density of the coolant surrounding the individual element subassemblies will again be reached and the reactor will operate at this temperature.

When the power required of the reactor changes rapidly there may be a surge of coolant either into or out of the tubular member 130 depending on whether power is increasing or decreasing. When the coolant is surging into the tubular member 130 it will tend to compress the vapor contained in the tubular member. The steam vent channel 146 then will allow the vapor to escape through the opening 148. The vapor in flowing out the steam vent 146 will pass through the coolant contained in the lower portion of the steam vent 146 but this will offer little resistance due to the relative small amount of coolant which is displaced.

The above embodiment of the invention has been described in detail using as an example a small highly enriched reactor in which the fuel is in the form of individual plates, a plurality of which are mounted on a common tubular member to form a fuel element subassembly. In this case, the detector coolant is also used as the moderator for the fission neutrons and is preferably water under sufficient pressure to prevent its transformation into a vapor in the coolant channels and the reactor pressure vessel. Of course, the coolant contained in the interior of the tubular member 130 of each fuel element subassembly 102 will be partially converted to a vapor depending on the reactor load as explained above. Many modifications of the above structure are possible and the control method of this invention will still operate. The only requirement for successful operation of this invention is that the moderator used in the reactor be a liquid which can be transformed into a vapor so that an increase in the temperature of the individual fuel elements 152 will cause a decrease in the average density of the moderator, thus decreasing the reactivity of the individual fuel elements 152.

Figure 10:
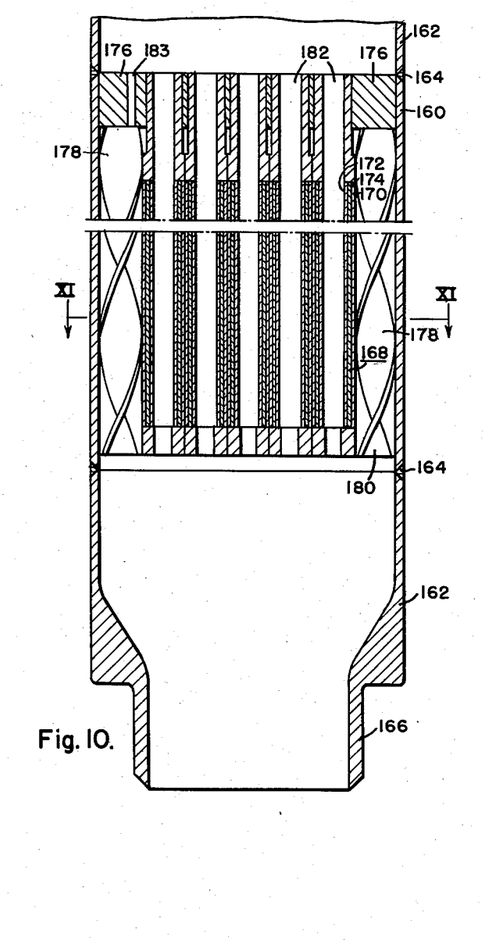
FIG. 10 is a longitudinal section of a modified fuel element subassembly for use in FIG. 1 using tubular fuel elements instead of the plate type of fuel elements shown in FIG. 6.
Figure 11:
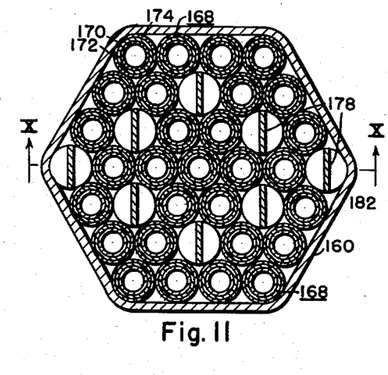
FIG. 11 is a horizontal section taken along line XI—XI of FIG. 10 showing the arrangement of the individual tubular fuel elements in the modified fuel element subassembly of FIG. 10.

FIGS. 10 and 11 illustrate a modified form of a fuel element subassembly for use in the reactor shown in FIG. 1. This modified form of subassembly has a tubular outer support piece 160 preferably zirconium or an alloy of zirconium having a hexagonal cross section. Attached to each end of the tubular support 160 by any desired means, such as annular welds 164, are tubular end pieces 162 which have a cross section similar to the tubular support 160. Each end piece 162 converges into a cylindrical shaped end 166 which fits in similarly shaped holes in a top support plate similar to support plate 90 and a bottom support plate similar to support plate 96 of FIG. 1. The individual fuel elements 168 are in the form of longitudinal tubular members and are attached to an upper support plate 176 by welding or the like, so that their center opening is in line with a similar opening in support plate 176. Support plate 176 in turn is secured to the inner surface of the tubular outer support 160, for example as by welding. Each of the tubular fuel elements 168 consists of an outer tubular member 170, a center tubular member 174 and an inner tubular member 172. The outer tubular member 170 and inner tubular member 172, preferably formed of zirconium or an alloy of zirconium, are the cladding for the center tubular member 174 which contains the U-235 fuel. In this type of fuel structure, the same quantity of fuel as used in the reactor shown in FIG. 1 will be used in the tubular fuel elements; they will have an outer diameter of .310 inch and an inner diameter of .200 inch. Since the tubular members 170 and 172 have a .015 wall thickness, this means that the tubular fuel 174 will have an inner diameter of .230 and an outer diameter of .280. The individual tubular fuel elements 174 have an overall length of 36 inches which is the same as the overall length of the fuel plates 152 of FIG. 5. The inner and outer tubular members 172 and 170, respectively, converge at each end so that the tubular fuel 174 is completely covered on all surfaces by the cladding material. Interdispersed between the tubular fuel elements 168 are eight spacing members 178, each of which consists of a flat strip of material, preferably zirconium or an alloy of zirconium, which is twisted into a spiral as shown in FIG. 10. A small vent opening 183 is provided in the support plate 176 so that any gas trapped in the tubular support 160 may be vented in order that the coolant may fill this volume. This vent opening should be maintained small so that the rate of escape of the vapor is relatively small compared to the rate at which the coolant is changed to a vapor when the reactor is operating at its power level. The space between adjacent fuel elements 168 and space surrounding the spacing members 178 is open at the bottom 180 of the fuel element subassembly so that the reactor coolant or a vapor of the coolant can completely fill the fuel element subassembly. Of course, the coolant will flow through the center openings 182 of the individual tubular fuel elements 168 and pass out of the reactor, with only a part of the coolant filling the area surrounding the outside of the tubular fuel elements 168. In this manner, the fuel element subassembly of FIG. 10 will operate in the same manner as the fuel element subassembly of FIG. 6 to control the power level of the reactor of FIG. 1 by varying the average density of the moderator. As the average temperature of the reactor rises, part of the coolant trapped in the fuel element subassembly between the tubular fuel elements by the support plate 176 will be converted to a vapor, the rate of conversion, of course, depending upon the temperature of the reactor. As the coolant temperature rises, the rate at which the coolant is converted to a vapor will increase and more will accumulate in the subassembly, thus lowering the average moderator density. This, in turn, will decrease the power level at which the reactor is operating thus lowering the average temperature of the reactor and bringing the reactor back to a state of equilibrium. If the average coolant temperature goes down, some vapor will be condensed thus increasing the density of the coolant and raising the average temperature.

Figure 12:
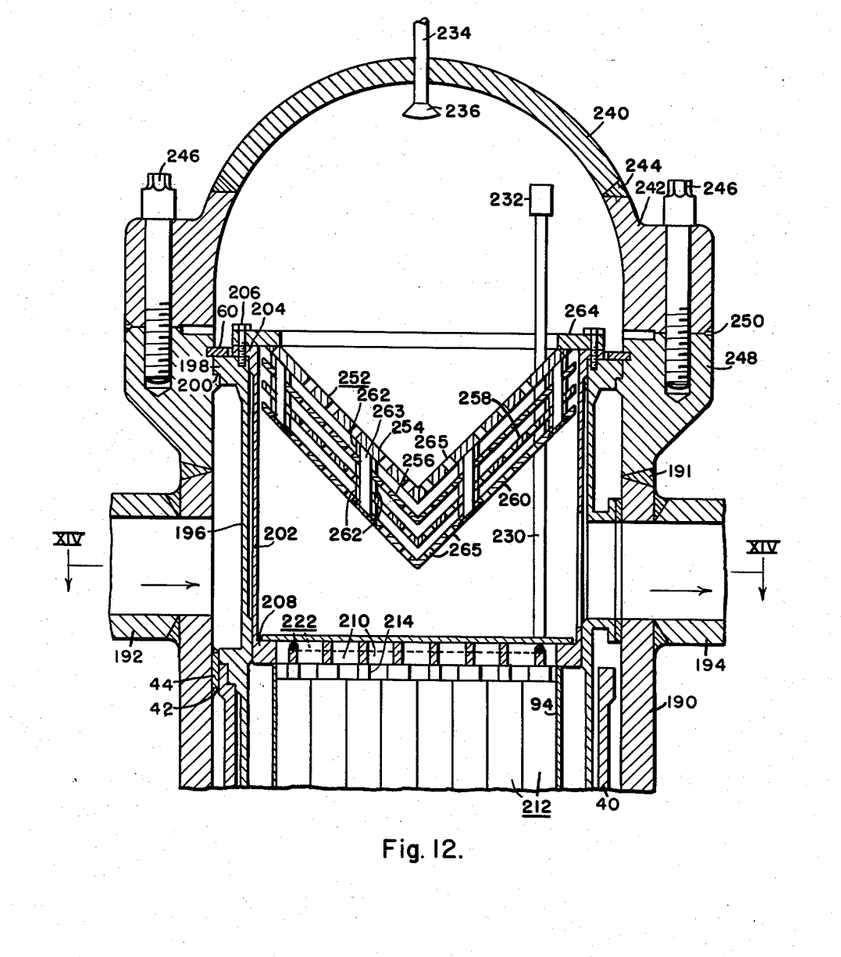
FIG. 12 is a partial longitudinal section of a modified form of the reactor of FIG. 1 showing the installation of pressurizing means within the reactor vessel.
Figure 13:
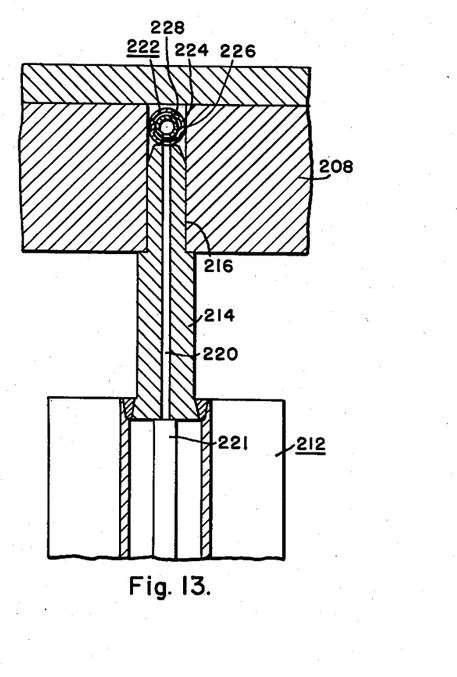
FIG. 13 is an enlarged partial longitudinal section showing the modification of the upper end of the fuel element subassembly shown in FIG. 6 to allow for internal pressurizing of the reactor for use with the form of invention shown in FIG. 12.
Figure 14:
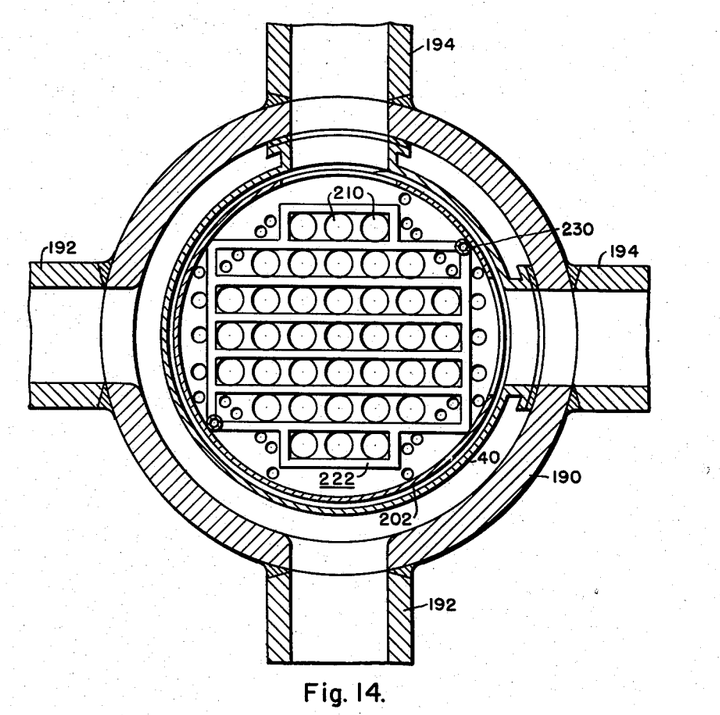
FIG. 14 is a horizontal section taken along line XIV—XIV of FIG. 12 showing the connections of the individual fuel element subassemblies with the manifold for the internal pressurizer of FIG. 12.

FIG. 12 illustrates a modified form of the reactor shown in FIG. 1 so as to incorporate a pressurizer in the reactor pressure vessel. Some type of pressurizer is necessary in any reactor system using pressurized water as the reactor coolant and moderator, in order to maintain water under sufficient pressure to prevent its boiling in the reactor core coolant channels. In previous reactor systems, this pressurizer has always been included in a separate vessel, but the control system of this invention is particularly adapted to the inclusion of the pressurizer in the reactor pressure vessel. The pressure vessel 190 of FIG. 12 is modified by increasing its overall height so that sufficient room inside the pressure vessel is available for the pressurizer. The pressure vessel 190 has a suitable coolant inlet pipe 192 and a coolant outlet pipe 194 secured to its outer surface by welding or the like. Mounted inside the pressure vessel is a thermal shield 40 which is an exact duplicate of the thermal shield 40 of FIG. 1, and a second thermal shield 196 which is a modification of the thermal shield 50 of FIG. 1. Thermal shield 196 has a slightly increased length in order to accommodate the increased volume of the pressure vessel necessary for the pressurizer. The thermal shield 196 is attached to the inner surface of the pressure vessel 190 by means of an outwardly projecting circumferential flange 198 at its upper end which engages an inwardly projecting shoulder 200 formed on the inner surface of the pressure vessel 190. The thermal shield is locked in place by means of a split retaining ring 60 which fits in a groove in the pressure vessel and may be held in place by cap screws (not shown). The upper support member 202 for the fuel element subassemblies is a slightly modified form of the upper support member 80 of FIG. 1, in that its length is slightly increased. The support member 202 is mounted on the top edge of the thermal shield 196 by means of an outwardly projecting flange 204 and cap screws 206 which pass through the flange 204 and thread into the upper end of the thermal shield 196. The bottom wall 208 of the support member 202 has a plurality of openings 210 which allow the coolant to pass through the fuel element subassemblies 212 and out of the reactor pressure vessel by means of the coolant outlet 194. Each of the fuel element subassemblies 212 of FIGS. 12 and 13 is the same as the fuel element subassemblies 102 shown in FIG. 6 except that the steam channel 146 of FIG. 6 is replaced with a modified steam channel 221 which is open at its lower end and spaced from the lower end cap 138 of FIG. 6 and connected to a manifold 222 at its top by means of a conduit 220 formed in the center of the upper end cap 214 of the fuel element subassembly. Fuel element subassemblies 112 containing control rods may be provided in this embodiment but are not shown in FIG. 12. The upper end cap 214 of the fuel element subassembly 212 is a slightly modified form of the upper end cap 132 of the subassembly of FIG. 6 in that the passageway 220 is provided for connecting the steam channel 146 with the manifold 222. The manifold 222 comprises an outer conduit 224 and an inner conduit 226 which is radially spaced from the outer conduit by means of small inwardly projecting areas 228 formed on the outer conduit 224. Each of the fuel element subassemblies 212 of FIG. 12 are connected to the manifold 222 as shown in FIG. 14 by any desired means such as welding or the like. The manifold 222 has a main branch which surrounds the complete reactor core and then suitable cross branches so that each subassembly 212 may be connected to the manifold 222 all as shown in FIG. 14. The manifold 222 is, in turn, connected to a riser 230 which terminates in a spray nozzle 232 in the upper part of the reactor pressure vessel. A cold water line 234 which passes through the top closure 240 of the reactor pressure vessel terminates in a second spray head 236. The top closure 240 is attached to a flange member 242 by means of an annular weld 244. A plurality of bolts 246 which pass through the flange member 242 and thread into the flange 248 formed on the upper end of the reactor pressure vessel 190 are used for securing the top closure 240 to the reactor pressure vessel 190. If it is desired to completely seal the pressure vessel a small annular weld 250 may be used to join the adjacent edges of the top closure 240 and the pressure vessel 190.

When the reactor shown in FIG. 12 operates, vapor formed in the individual fuel element subassemblies 212 will be collected by the manifold 222 and rise in the line 230 and be discharged into the upper volume of the reactor pressure vessel by means of the spray head 232. Since the coolant contained in the interior of the individual fuel element subassemblies 212 is essentially in a stagnant condition, the temperature of this coolant will be higher than the temperature of the coolant flowing over the outer surface of the fuel element subassemblies. Thus vapor will be formed in the fuel element subassemblies and be capable of pressurizing the coolant flowing through the reactor. The cold water line 234 and spray 236 are provided so that the pressure in the upper part of the reactor pressure vessel may be accurately controlled by condensing the vapor which is formed in the fuel element subassemblies as it is discharged from the spray head 232. The supply of cold water to the spray 236 may be controlled by well known equipment so as to maintain the coolant system at any desired pressure. This invention, therefore, provides a means whereby the reactor coolant may be pressurized without the use of external mechanisms. Of course, the size of the conduit 220 should be made small enough so that sufficient vapor is retained in the fuel element subassembly to control the reactor as described above and only a small amount used for pressurizing the reactor.

A baffling arrangement 252 is mounted between the top of the individual subassemblies 212 and the upper volume of the reactor pressure vessel in order to prevent sudden surges between the coolant flowing in the reactor and the vapor contained in the upper volume of the pressure vessel as the power level of the reactor changes by forcing the coolant and vapor to flow through a series of intricate openings. The baffling arrangement consists of a plurality of inverted conically shaped baffles 254, 256, 258 and 260 which are spaced from each other by means of the tubular spacers 262 and are held together as a unit by the pins 263, the ends of which are welded to baffles 254 and 260, respectively. Each of the conical baffles is provided with a plurality of openings 265 so that the pressure in the upper portion of the reactor pressure vessel can equalize with the pressure of the coolant flowing through the reactor core, yet sudden surges will be prevented. The liquid level of the coolant will be approximately at the top of the baffling arrangement. The upper conical baffle 254 is attached to an annular ring 264 by any desired means such as by welding. The annular ring 264, in turn, is attached to the upper surface of the upper support plate 202 by means of the cap screws 206 used in securing the upper support plate to the upper surface of the thermal shield 196.

Figure 15:
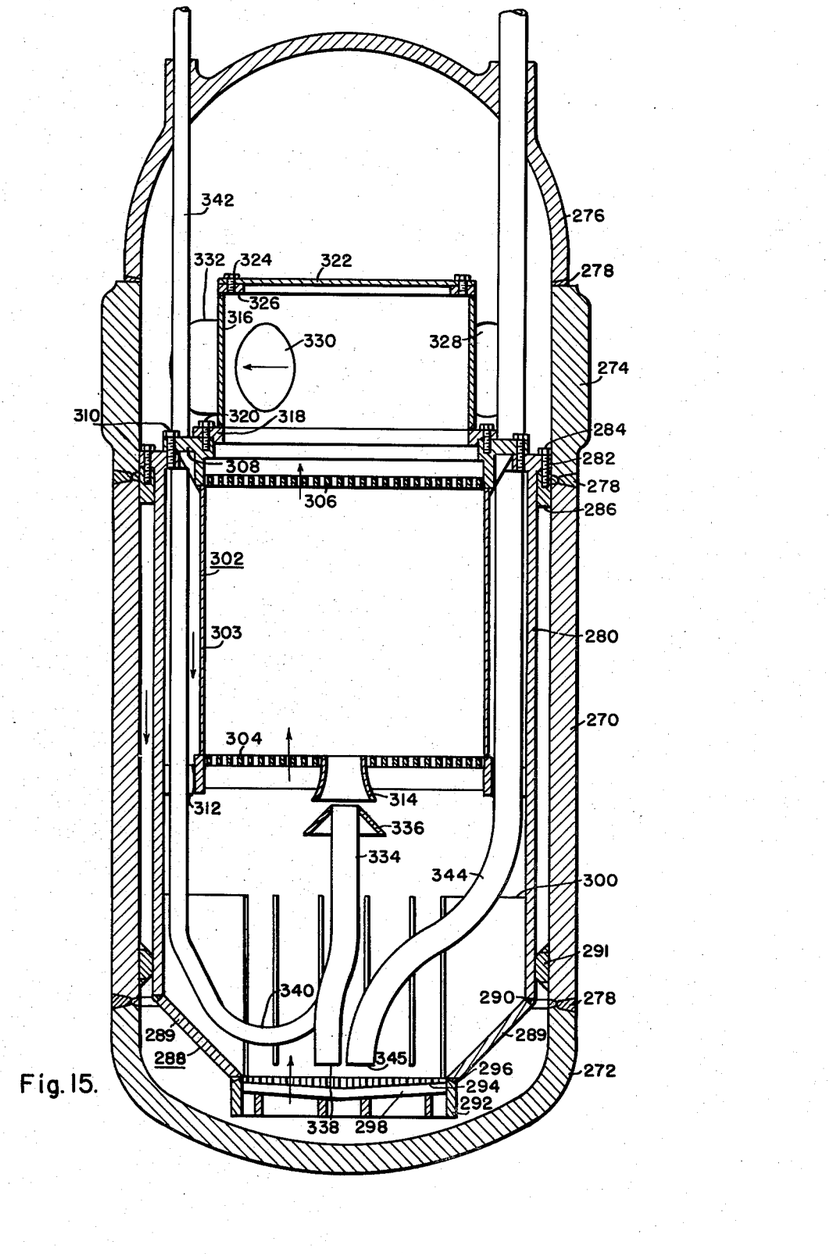
FIG. 15 is a vertical section showing another embodiment of this invention using fuel elements in the form of discrete pellets.
Figure 16:
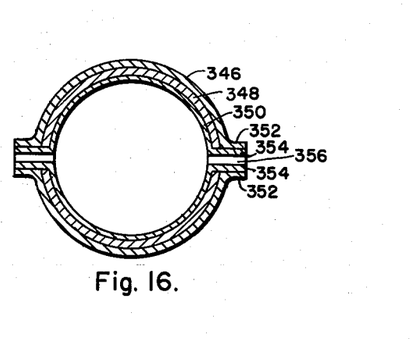
FIG. 16 is an enlarged cross section of one of the discrete fuel pellets used in the reactor shown in FIG. 15.

Illustrated in FIG. 15 is a third embodiment of this invention utilizing fuel in the form of discrete pellets which may be as shown in FIG. 16. In this embodiment of the invention, the fuel pellets are contained in the lower portion of the reactor pressure vessel when the reactor is not operating, and are transported into the central portion of the pressure vessel when the reactor is operating. Sufficient pellets are provided so that the central portion of the container or core container 302 will be completely packed with pellets when the reactor is operating. The pressure vessel consists of a center section 270 which is attached to a generally spherical shaped bottom section 272 by means of an annular weld 278. The upper end of the center section 270 is attached to a slightly thicker intermediate section 274 by means of a second annular weld 278. The top of the pressure vessel is closed by means of a hemispherical shaped top section 276 which is attached to the intermediate section 274 by means of an annular weld 278. The various sections of the pressure vessel can be fabricated from any suitable material such as ordinary carbon steel, provided the inner surface is lined with a suitable corrosion resistant material such as stainless steel.

Mounted in the interior of the pressure vessel is an outer thermal shield 280 which is radially spaced from the inner surface of the pressure vessel. The thermal shield 280 is attached to the pressure vessel by means of an outwardly projecting flange at its upper end which rests on a plurality of spaced inwardly projecting pads 286, which are, in turn, attached to the pressure vessel by any desired means such as welding. A plurality of bolts 284 which pass through the flange 282 and thread into the spaced pads 286 are used for securing the flange to the spaced pads 286. Suitable openings in the flange 282 (not shown) are provided so that the coolant may flow downward through the annular area between thermal shield 280 and pressure vessel 270. Attached to the lower end of the thermal shield 280 by means of an annular weld 290 is an inverted frusto-conical shaped member 288. The member 288 consists of a plurality of circumferentially closely spaced supporting arms 289 which support a grid member 292, so that the coolant after passing down through the annular area may flow through the spaces between the supporting arms 289 and upward through the reactor fuel bed. A plurality of spaced pads 291, which are attached to the inner surface of the reactor pressure vessel by any desired means, such as welding, are provided to accurately position the lower end of the thermal shield 280. The bottom end of each of the supporting arms 289 is attached to a supporting grid 292 which supports a screen member 294, which in turn supports the fuel pellets. The bottom grid 292 supports the screen member 294 by means of a plurality of cross members 298. A plurality of circumferentially spaced flat plates 300 extend radially into the pressure vessel and are attached to the inner surface of the thermal shield 280 and are fabricated from a suitable neutron absorbing material such as hafnium, boron or cadmium. The neutron absorbing plates 300 are provided to insure that the fission process stops when the pellets are transferred from the container 302 to the bottom portion of the pressure vessel. The core container 302 is provided with a perforated bottom wall 304 and a perforated top wall 306 which are attached to a circular side wall 303 by any desired means such as welding. The perforated top wall 306 has a relatively massive rim which has an outwardly projecting flange 308 which is used for mounting the core container 302 on the top surface of the thermal shield 280. A plurality of bolts 310 which pass through the flange 308 thread into the top surface of the thermal shield 280 and are used for securing the core container 302 in place. A plurality of spaced pads 312 which are attached to the inner surface of the thermal shield 280, by welding or the like, are provided at the bottom of the core container 302 for accurately positioning the core container. A circular deflecting baffle 314 is mounted in a large central opening in the perforated bottom wall 304 to allow for the transporting of the fuel pellets from the bottom portion of the reactor pressure vessel into the interior of the core container 302. The top opening in the core container 302 is closed by means of a cylindrical member 316 having a top wall 322 which is secured to a flange 326 formed on the top of member 316 by means of bolts 324. The cylindrical member 316 has an outwardly projecting flange 318 at the bottom which rests on the flange 308 of the core container 302 and is secured in position by a plurality of bolts 320 which pass through the flange 318 and thread into the flange 308 of the core container 302. The flange 308 is provided with a plurality of openings (not shown) so that coolant may flow downward in the annular area between the thermal shield 280 and core container 302. A coolant inlet opening 328 is provided in the intermediate member 274 of the reactor pressure vessel so that the coolant may flow into the interior of the pressure vessel. A coolant outlet opening 330 is provided in the cylindrical member 316 and is connected to a similar opening in the intermediate section 274 of the reactor pressure vessel by means of a tubular section 332. Thus a coolant may flow into the reactor pressure vessel downward through the annular area between the reactor pressure vessel 270 and the thermal shield 280 and between the thermal shield 280 and the core container 302. That portion of the coolant which flows between the thermal shield and the core container upon reaching the lower edge of the core container 302 will turn and flow upward through the core container 302, while the portion of the coolant which flows between the thermal shield and the reactor pressure vessel will flow to the bottom of the thermal shield before it turns and flows upward through the core container. After passing through the core container, the coolant will flow out the coolant outlet 330.

Mounted in the lower portion of the reactor pressure vessel is a transport tube 334 which is used for transporting the fuel pellets from the lower portion of the reactor vessel into the core containing 302. A conical deflector 336 is attached to the upper open end of the transport tube 334 and is located so as to direct the coolant flow inward and upwardly through the deflecting baffle 314 in the bottom partition 304 of the core container 302. By directing the coolant flow inwardly and upwardly through the opening in the core container, the fuel pellets which have previously been transported into core container 302 are prevented from falling downward into the lower portion of the reactor pressure vessel once they have been transported into the core container 302. The lower end of the transport tube 334 terminates in an open end 338 spaced from the supporting screen 294. A suitable supply line 340 for supplying a flow of high pressure fluid to the transport tube 334 is joined to the transport tube near its lower end. The supply line 340 is connected to a line 342 which passed through the top section 276 of the reactor pressure vessel. When a flow of high pressure fluid, preferably the same fluid as used for the reactor coolant and pressurized by external means (not shown), is established in the lines 340 and 342, the hydraulic action of the coolant flow will lift the pellets from the supporting screen 294 and transport them by means of the transport tube 334 to the interior of the core container 302 and retain them there until the high pressure fluid is removed. The fuel pellets will be retained in the core container 302 when the reactor is operating by the upward flow of the reactor coolant through the core container. A pellet loading and removal tube 344 is also mounted in the reactor pressure vessel and passes through the annular area between the thermal shield 280 and the core container 302. The loading tube 344 terminates in an open end 345 spaced from the supporting screen 294 in the lower portion of the reactor pressure vessel. When it is desired to load pellets into the reactor, they can be transported through the loading tube 344 by the hydraulic action of a high pressure fluid flowing in this tube. Also, when it is desired to remove pellets from the lower portion of the reactor, the pressure in the tube 344 can be reduced below the pressure existing in the reactor pressure vessel, and the pellets in the lower portion of the pressure vessel will tend to rise in the tube 344 and be transported to another location.

The individual pellets are shown in FIG. 16 and consist of two hemispherically shaped fuel elements 348. The hemispherical shaped fuel elements 348 are clad on their inner and outer surfaces by hemispherically shaped cladding members 346 and 350. The cladding members 346 and 350 each has an outwardly projecting flange 352 and 354, respectively, which are joined together by any desired means such as welding. A plurality of radial openings 356, circumferentially spaced, are provided in each fuel pellet. Thus, the reactor coolant can fill the hollow of each pellet and when converted to a vapor by the temperature of the fuel pellet, the vapor can escape through the holes 356. The fuel pellets should have an overall outer diameter of .75 inch and an inner diameter of .65 inch. The cladding material should preferably be a material having a low neutron absorption cross section and, in addition, be corrosion resistant in high pressure, high temperature water. A preferred metal is zirconium or an alloy of zirconium. The outer cladding is preferably .02 inch thick and the inner cladding .01 inch thick, thus making the hemispherical fuel elements .02 inch thick. In order for a reactor, constructed according to FIG. 15, to supply the same amount of power as the reactor shown in FIG. 1, 15.60 kilograms of uranium 235 would have to be loaded into the discrete pellets. This can be accomplished by using about 96,000 pellets as shown in FIG. 16 having an outside diameter of .75 inch. This number of pellets will completely fill a reactor having a core container 302 30 inches in diameter and 30 inches between the top and bottom partitions. With water filling the voids between and the hollow centers of the individual pellets, this number of pellets when contained in a core container 302 of the above dimensions will be sufficient to establish and maintain a chain reaction.

Once the above chain reaction starts, it will be accurately controlled by the partially closed hollow of each discrete fuel pellet. This partially closed hollow will contain essentially stagnant coolant and thus the temperature on the inside of the fuel pellet will be above the temperature on the outer surface of the fuel pellet, and a portion of the coolant will be transformed into a vapor. Part of the vapor will escape and be replaced by coolant which in turn will be converted to a vapor. As was the case with the reactor of FIG. 1, a state of equilibrium between the rate at which the vapor is formed and the rate at which it escapes will be reached depending upon the reactor temperature which will vary with the power demanded of the reactor. This escape of the vapor can be controlled by proper size of the holes 356 in the spherical fuel elements so that sufficient vapor is retained in the fuel elements to control the reactor. As the power demand of the reactor increases, the average coolant inlet temperature will decrease thus decreasing the temperature of the inner surface of the hollow fuel pellets thus condensing part of the vapor contained in the individual fuel pellets. This condensing of the vapor will increase the average coolant density, and since the coolant is also the moderator, this will increase the average moderator density. By increasing the average moderator density the reactivity or power level at which the reactor is operating will be increased thus supplying the increased power demanded of the reactor. When it is desired to stop the reactor shown in FIG. 15, all that is necessary is that the coolant flow be stopped and the vast majority pellets contained in the core container 302 will fall by gravity through the central opening in the bottom partition 304 into the lower portion of the reactor pressure vessel. Due to the neutron absorption plates 300 mounted in the lower portion of the reactor pressure vessel, it will be impossible for a chain reaction to be established in this lower portion, and the chain reaction will come to a stop thus stopping the reactor.

In order to start the reactor, all that is necessary is to transport the fuel pellets from the lower portion of the reactor into the core container 302 by means of the transport tube 334 and establish a sufficient flow of coolant upward through the core container to retain the pellets in the core container. A flow of coolant on the order of 16,000 gallons per minute when water under a pressure on the order of 2,000 pounds per square inch is used as a coolant will be sufficient for this purpose.

While this invention has been described in detail with reference to three specific embodiments as required by the patent statutes, it is, of course, susceptible to many modifications without departing from the spirit or scope thereof. For example, all embodiments of the invention were specifically described for a small reactor using highly enriched fuel, but the invention would be equally adaptable to a large reactor using slightly enriched fuel or natural uranium as fuel. In addition, the method of reactor control disclosed in this invention will greatly increase the production of new fuel from fertile material contained in a slightly enriched reactor, since no neutrons will be lost by absorption in poison materials as in previous reactors. The same feature will improve the performance of seed reactors since it will increase the number of neutrons escaping from the seed core thus increasing the fertile material converted to fuel in the blanket surrounding the seed.

The control rods used in starting and stopping the reactor shown in FIG. 1 could be eliminated if the unitized pressurizer of FIG. 12 is used with the reactor of FIG. 1. This can be accomplished by providing a connection to the vent 232 of FIG. 12 so that a high pressure gas could be injected into the pressurizer manifold 222 to force the water from the individual control channel of each fuel element subassembly 212. Since the water is also the moderator the removal of the water from the reactor core will stop the reactor because the fission neutrons will not be slowed to thermal velocities. In order to start the reactor the gas could be bled off thus allowing water to again fill the control channels of the individual fuel element subassemblies 102. Accordingly, the invention should not be limited to the specific embodiments described, but only as required by the prior art.

I claim as my invention:

A reactor comprising, a closed pressure vessel, lower and upper water coolant plenum chambers in said pressure vessel, a coolant inlet in said lower plenum chamber, a coolant outlet in said upper plenum chamber, a plurality of fuel elements disposed between said upper and lower coolant plenum chambers, each fuel element having a plurality of longitudinally disposed fuel sections containing material capable of sustaining a chain reaction, a plurality of unobstructed coolant channels in each of said fuel elements permitting substantially unimpeded flow of coolant between said lower and upper plenum chambers, at least one of said fuel elements having at least one control chamber substantially coextensive with the fuel sections of said fuel elements and having a control chamber inlet communicating with said lower coolant plenum chamber, and a control chamber restricted vapor vent communicating with said upper coolant plenum chamber, whereby variation in the reactor heat flux will cause variation in the average moderator density in said control chamber.

References Cited in the file of this patent

UNITED STATES PATENTS

| | | |
|---|---|---|
| 2,708,656 | Fermi et al. | May 17, 1955 |
| 2,799,642 | Hurwitz et al. | July 16, 1957 |
| 2,810,689 | Wigner et al. | Oct. 22, 1957 |
| 2,865,826 | Stewart | Dec. 23, 1958 |

OTHER REFERENCES

Business Week, Sept. 1, 1945, page 63.
Nucleonics, vol. 12, No. 7, pp. 43–47, July 1954.